Figure 2A:
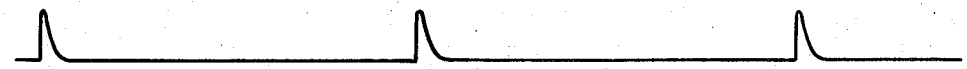

United States Patent
Gordon

[15] 3,695,252
[45] Oct. 3, 1972

[54] ULTRASONIC DIAGNOSTIC APPARATUS

[72] Inventor: George Andrew Douglas Gordon, Friston House, 25 Church Road, Richmond, England

[22] Filed: Aug. 31, 1907

[21] Appl. No.: 68,209

[30] Foreign Application Priority Data

Sept. 26, 1969 Great Britain..........47,387/69

[52] U.S. Cl. .................128/2 V, 73/67.7, 128/24 A
[51] Int. Cl. ................................................A61b 10/00
[58] Field of Search........128/2 V, 2 R, 24 A, 2.05 R, 128/2.05 F, 2.05 V; 73/67.7–67.9

[56] References Cited

UNITED STATES PATENTS

| | | | |
|---|---|---|---|
| 3,565,057 | 2/1971 | Hart | 128/2.05 R |
| 3,427,868 | 2/1969 | Charbonnier et al. | 73/67.9 |
| 3,427,866 | 2/1969 | Weighart | 73/67.7 |
| 3,310,049 | 3/1967 | Clynes | 128/2.05 V |
| 3,280,622 | 10/1966 | Carlin | 128/24 A |
| 3,167,709 | 1/1965 | White et al. | 73/67.9 X |
| 3,545,258 | 12/1970 | Judd | 73/67.9 |
| 3,554,015 | 1/1971 | Brech | 73/67.9 |
| 3,554,016 | 1/1971 | Brech | 73/67.9 |
| 3,334,622 | 8/1967 | Brech | 128/2 V |
| 3,238,767 | 3/1966 | Clynes | 73/67.9 |

FOREIGN PATENTS OR APPLICATIONS 842,653   7/1960   Great Britain..............73/67.9

OTHER PUBLICATIONS

Crawford, H. D. et al., I.R.E. Transactions on Med. Electronics, Sept. 1959, pp. 141–146.

Primary Examiner—Kyle L. Howell
Attorney—Baldwin, Wight & Brown

[57] ABSTRACT

The invention relates to diagnostic apparatus capable of giving an easily-interpreted indication differentiating normal lung tissue from abnormal tissue.

Periodic pulses of ultrasonic energy are transmitted by means of a probe and reflected pulses are rectified and smoothed. Rectangular pulses are produced from the smoothed signals and further pulses are derived from the trailing edge of each of said rectangular signals.

A bistable trigger circuit is set by each of the transmitted pulses and unset by each of said further pulses so that the on/off ratio of the bistable trigger circuit depends on the length of time for which the reflected signals remain above a predetermined level.

Additional reflections received after the first fall below said predetermined level are ignored. The bistable circuit controls a current-measuring device through an integrator.

5 Claims, 25 Drawing Figures

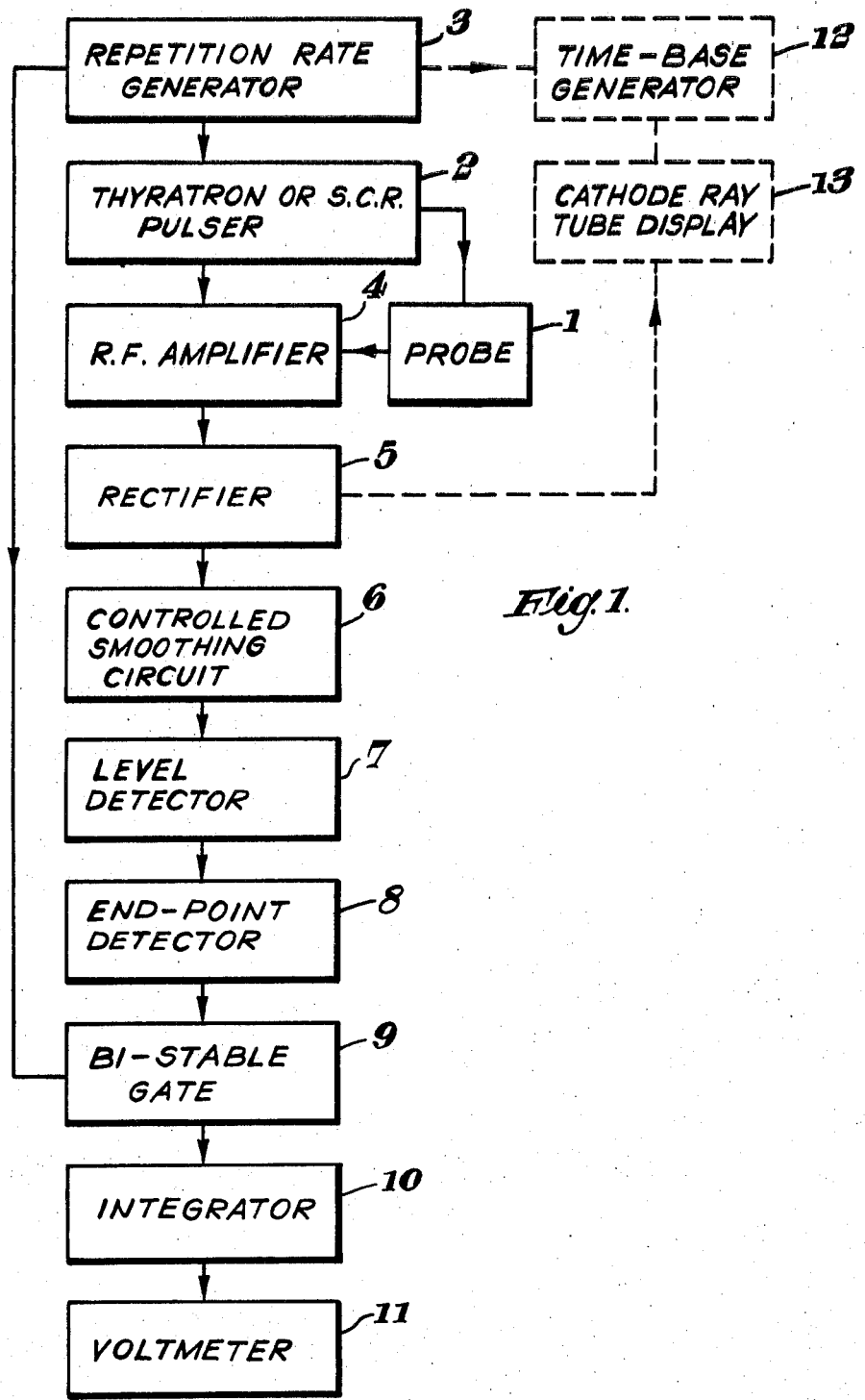

ULTRASONIC DIAGNOSTIC APPARATUS

This invention relates to diagnostic apparatus, and it is an object of the invention to provide apparatus capable of giving an indication differentiating normal lung tissue from abnormal tissue.

It has already been proposed to utilize ultrasonic pulse echo techniques to investigate lung tissue. In carrying out such investigations, pulses of ultrasonic energy are transmitted to the tissue being investigated, and signals derived from the echos returned by the tissues are displayed on a cathode-ray tube. Healthy lung tissue absorbs ultrasonic energy very rapidly but much of the energy is reflected back from the lung surface and at some angles will cause reverberation. Echoes from the chest wall usually obscure those from normal lung. Abnormal tissues, on the other hand, can be more readily penetrated and the large echoes produced by the interface between abnormal and normal tissues are less directional than those from the surface of normal lung.

Thus, it is possible to diagnose the presence of abnormal tissue from the increased number of echo signals shown in the trace on the cathode-ray tube, provided care is taken to ignore signals produced by the presence of normal reflective surfaces in the body, such as the liver and spleen surfaces, and to distinguish between the deep echoes from diseased lung and the delayed echoes produced by the reverberation from the surface of normal lung.

The use of a cathode-ray tube for the display will normally necessitate the provision of an external power supply and, accordingly, it is frequently inconvenient to operate apparatus of this kind without moving the patient to a special location. Further, apparatus of this kind tends to be expensive.

It is, therefore, an object of the present invention to provide simple ultrasonic diagnostic apparatus for the investigation of lung tissues which may be constructed in a simple and relative inexpensive manner and can be designed to operate from re-chargeable batteries.

The invention consists in diagnostic apparatus including means for transmitting periodic pulses of ultrasonic energy, means for receiving reflected pulses of said energy and for deriving unidirection signals therefrom, means for smoothing said signals, a bi-stable trigger device set after the transmission of each pulse and unset when the amplitude of each of said smoothed signals drops below a predetermined value, and indicating means measuring the ratio of the set and unset periods of said trigger device.

Preferably, said indicating means are in the form of a conventional current-measuring meter which may be calibrated in arbitrary units of penetration to indicate how well or how badly ultrasound penetrates in to the lung. This arbitrary indication depends upon the point in time at which the ultrasonic energy echo amplitude has dropped to a predetermined value.

The smoothing means may be followed by a level detector, for example in the form of a monostable trigger circuit such as a Schmitt trigger. The trigger will be turned on when each smoothed signal reaches a first predetermined amplitude and will be turned off when the smoothed signal drops to a second predetermined value. The monostable trigger device is preferably followed by an end-point detector, for example in the form of a differentiating circuit which produces a pulse corresponding to the trailing edge of each of the pulses produced by the monostable trigger device. The bi-stable device is then set by each of the transmitted pulses and is unset by the first pulse from the end-point detector. Thus, the bi-stable trigger device will be set and unset at a constant rate, but the mark-space ratio will vary with variations in the length of time during which the amplitude of the first smoothed signal received after each transmitted pulse exceeds said first and second predetermined values.

The smoothing means must be designed so that the smoothed signals do not fall below the second predetermined value during the short silent zones which normally occur between echo signals produced by the chest wall and the echo signals produced by the lungs nor during silent zones caused by the presence of fluid. Thus, the time constant of the smoothing means must be relatively long. On the other hand, the time constant must be short enough to ensure that each smoothed signal has decayed below the second predetermined value before echo signals are received from the liver or any other organ located behind the lung being investigated. The design of said smoothing means is well-known to those skilled in the art and, accordingly, no details of the construction required need be given here.

It is not important for apparatus in accordance with the invention to give an absolute reading of the depth of penetration of the ultrasonic energy since diagnosis can be based on the difference between the penetration of healthy tissue and the penetration of abnormal tissue. Hence, it will be convenient to provide a sensitivity control which may be adjusted to a point where normal lung tissue provides a convenient deflection of the meter pointer. Any abnormal tissue will then prolong the echo signals so that a greater deflection of the meter pointer will occur. It will be understood that a simple indication of this kind can be interpreted much more easily and by less highly skilled staff than a cathode-ray tube oscilloscope display.

As echoes may be received from parts of the body located as far as thirty centimeters from the transducer used for transmitting and receiving the ultrasonic energy, it is desirable that the pulse repetition frequency should be, at the most, 2,500 pulses per second. Any convenient ultrasonic frequency may be used, but a frequency of the order of 2 MHz is preferred. Such a frequency may be used with a transducer which is small enough to be directed between the ribs of a patient and does not present problems in the generation and detection of ultrasonic energy. Relatively long pulses are preferred to short pulses, and a narrow-band high-Q system is suitable both for the transducer and the amplifier. After amplification, the received signals are rectified in the normal manner before being applied to the smoothing circuit.

One method of performing the invention will now be described with reference to the accompanying diagrammatic drawings, in which:

FIG. 1 is a block diagram of one embodiment of the invention; and

Figure 2B:
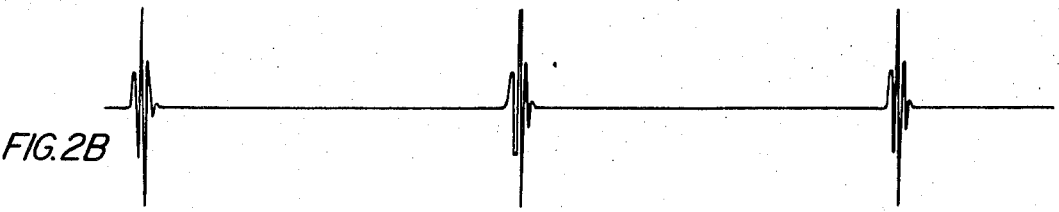
Figure 2C:
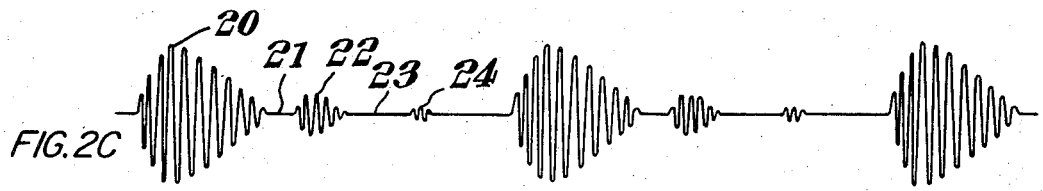
Figure 2D:
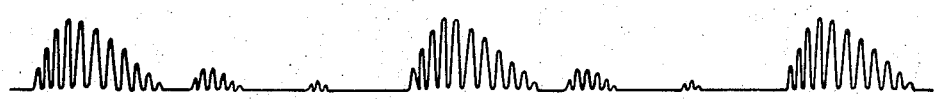
Figure 2E:
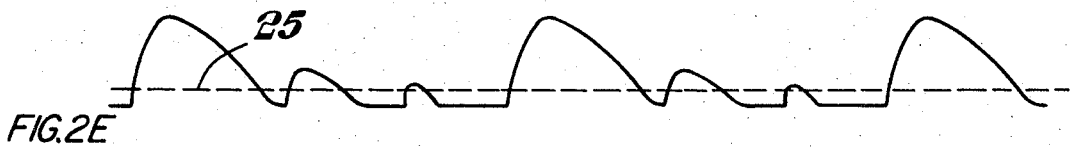
Figure 2F:
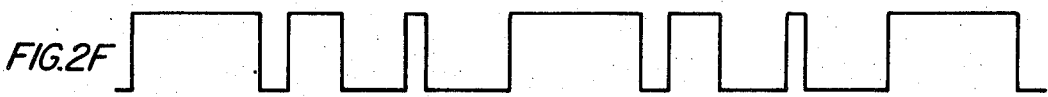
Figure 2G:
Figure 2H:
Figure 3A:
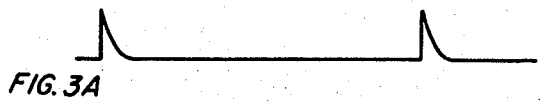
Figure 4A:
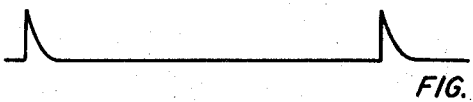
Figure 3B:
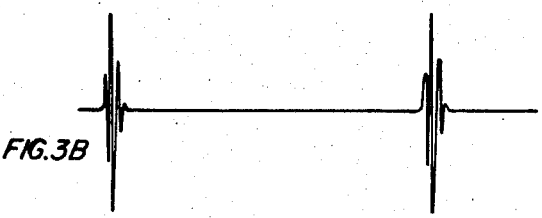
Figure 4B:
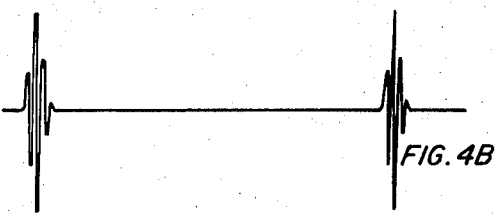
Figure 3C:
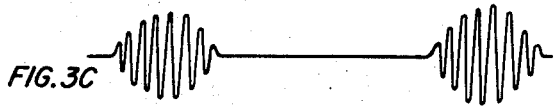
Figure 4C:
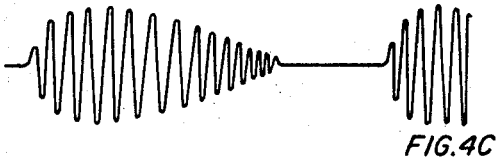
Figure 3D:
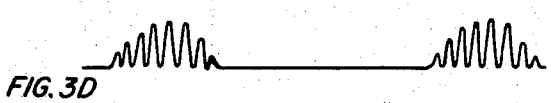
Figure 4D:
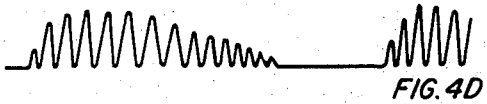
Figure 3E:
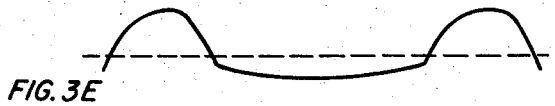
Figure 4E:
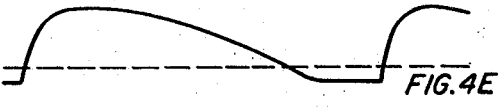
Figure 3F:
Figure 4F:
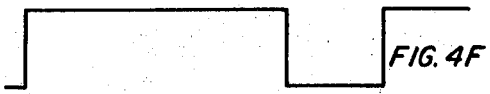
Figure 3G:
Figure 4G:
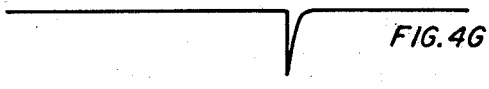
Figure 3H:
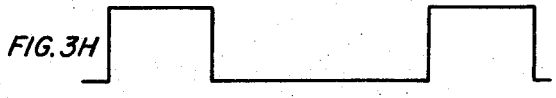
Figure 4H:

FIGS. 2A–H, 3A–H and 4A–H are diagrams showing the waveforms present in the various part of the apparatus illustrated in FIG. 1.

The apparatus illustrated in FIG. 1 includes a probe 1 in the form of an ultrasonic energy transducer having a natural frequency of the order of 2 MHz. The probe receives pulses of energy at its natural frequency from a thyratron or SCR pulser 2, the pulse repetition rate of which is controlled by a repetition rate generator 3. The repetition rate generator operates at about 2 KHz, producing positive going pulses capable of firing the thyratron or SCR pulser. Reflected radio frequency energy from the probe 1 is fed back to a radio frequency amplifier 4, the output of which is rectified by a rectifier 5. The output of the rectifier is passed to a controlled smoothing circuit 6 to produce a low frequency signal which is amplified and passed to a level detector 7. The level detector converts the smoothed low frequency signal to a series of substantially constant amplitude square waves, the duration of each of which is determined by the time for which the low frequency signal exceeds a predetermined amplitude.

The output of the level detector is passed to an end-point detector 8 which is in the form of a differentiating circuit and rectifier arranged to produce a pulse in response to the trailing edge of each pulse at the output of the level detector. These pulses are fed to a bi-stable gate 9 which is set by the pulses from the repetition rate generator 3 and unset by the pulses from the end-point detector 8. Thus, the output of the bi-stable gate is in the form of a series of rectangular pulses, the leading edge of each of which corresponds to the beginning of each pulse of energy fed to the probe and the trailing edge of each of which occurs at the time when the reflected energy from the probe first drops below a predetermined amplitude. These rectangular pulses are fed to an integrator 10 which produces an output voltage, the level of which is a measure of the average duration of the rectangular pulses. This voltage is fed to a voltmeter 11 which consequently gives a reading indicating the average duration of the reflections of the acoustic energy.

As already pointed out, the reflected energy due to each transmitted pulse is made up of a number of reflected pulses which add vectorially in a generally random manner so that they sometimes summate and sometimes cancel each other. Consequently, the signal received as a result of reflection usually drops substantially to zero and increases again a number of times between each pair of adjacent transmitted pulses. To distinguish between healthy lung tissue and abnormal tissue, it is necessary to consider only the duration of the first burst of reflected energy and it will be seen that the arrangement illustrated in FIG. 1 gives a reading which ignores all the subsequent reflections after the initial reflection from each transmitted pulse has dropped below a predetermined amplitude.

The circuit elements designated by dotted lines in the upper right-hand corner of FIG. 1 are those which would be provided in a known type of display system and comprise a time-base generator 12 and a cathode-ray tube display system 13. The time-base generator 12 is controlled by the repetition rate generator 3 and the cathode-ray tube 13 is controlled by the output of the rectifier 5. Thus, the elements 6 to 11 illustrated in FIG. 1 are used in a system in accordance with the invention in place of the elements 12 and 13 of a conventional system.

In FIG. 2, waveform A indicates the pulses at the output of the repetition rate generator. Assuming a frequency of 2 KHz, one of these pulses will be produced every 500 microseconds. Waveform B shows the bursts of acoustic energy supplied to the probe by the thyratron or SCR pulser. Waveform C illustrates the output of the R.F. amplifier 4 and it will be seen that the received signal builds up to a peak 20, falls to zero at 21 and again builds up to a peak 22, lower than the peak 20. There is then a further period of silence at 23, followed by a small pulse of energy at 24. Waveform D indicates the output of the rectifier 5 and waveform E shows the output of the controlled smoothing circuit 6. The broken line 25 in waveform E indicates the threshold of the level detector 7 and it will be seen that the durations of the rectangular pulses in waveform F correspond to the times for which the waveform E is above the line 25. Waveform G indicates the pulses produced by the end-point detector 8 corresponding to the trailing edges of the pulses in waveform F. Finally, waveform H indicates the output of the bi-stable gate 9 and it will be seen that the leading edges of the rectangular pulses in waveform H coincide with the pulses in waveform A while the trailing edge of each pulse in waveform H corresponds to the first pulse in waveform G, after the occurrence of each pulse in waveform A.

FIG. 3 again includes waveforms A to H but, in this case, pulses 22 and 24 in waveform C have been ignored. The duration of the reflections and hence the duration of the pulses in waveform H are assumed in this case to correspond to signals resulted from healthy tissue.

FIG. 4 is again similar to FIGS. 2 and 3 but, in this case, the longer reflections are shown resulting from abnormal tissue. It will be seen that the mark-space ratio for the waveform H in FIG. 3 is approximately 1 : 2 whereas the mark-space ratio in FIG. 4 is approximately 2.5 : 1. This is somewhat exaggerated, and normally the mark-space ratio for abnormal tissues will be approximately double the mark-space ratio for healthy tissues. This difference however, is quite sufficient to give an unambiguous reading on the voltmeter.

What I claim as my invention and desire to secure by Letters Patent of the United States is:

1. Diagnostic apparatus for distinguishing between healthy and unhealthy internal body tissue, comprising in combination:
   probe means for transmitting ultrasonic energy toward internal body tissue and for receiving reflected pulses of said energy;
   means for energizing said probe means periodically to transmit pulses of said ultrasonic energy, the periodicity of which transmitted pulses is such that energy reflected from healthy tissue due to each transmitted pulse constitutes at least one discrete burst of reflected energy made up of a number of pulses which add vectorially in a generally random manner and which burst decays substantially to zero prior to the next transmitted pulse;
   means connected to said probe means for rectifying the pulses of said burst of reflected energy and for smoothing such rectified pulses to produce a diagnostic signal conforming generally to the amplitude envelope of said rectified pulses; and indicating means responsive to said diagnostic signal for indicating the relative duration thereof with respect to the period of said transmitted pulses.

2. Diagnostic apparatus according to claim 1 wherein said indicating means includes bistable means connected to said means for energizing for producing one output state in response to initiation of each pulse transmission, and means connected to said bistable means for producing the other output state thereof in response to decay of said diagnostic signal below a selected level.

3. Diagnostic apparatus according to claim 2 wherein said indicating means also includes means for integrating said one output state of said bistable means and a voltmeter driven by such integrated output.

4. Diagnostic apparatus according to claim 3 wherein said indicating means also includes level detector means receiving said diagnostic signal for producing a rectangular wave output during the time said diagnostic signal exceeds said selected level, and means connected to said rectangular wave output and to said bistable means for producing the other output state of the latter in response to the trailing edge of said rectangular wave output.

5. Diagnostic apparatus according to claim 2 wherein said indicating means also includes level detector means receiving said diagnostic signal for producing a rectangular wave output during the time said diagnostic signal exceeds said selected level, and means connected to said rectangular wave output and to said bistable means for producing the other output state of the latter in response to the trailing edge of said rectangular wave output.

* * * * *